United States Patent
Abe et al.

(10) Patent No.: US 10,006,542 B2
(45) Date of Patent: Jun. 26, 2018

(54) CONTROLLER FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Kosuke Abe, Isehara (JP); Tomoyuki Suwabe, Atsugi (JP); Shin Tsukamoto, Isehara (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days. days.

(21) Appl. No.: 15/329,726

(22) PCT Filed: Jun. 24, 2015

(86) PCT No.: PCT/JP2015/068122
§ 371 (c)(1),
(2) Date: Jan. 27, 2017

(87) PCT Pub. No.: WO2016/017326
PCT Pub. Date: Feb. 4, 2016

(65) Prior Publication Data
US 2017/0219096 A1    Aug. 3, 2017

(30) Foreign Application Priority Data

Jul. 30, 2014   (JP) ................. 2014-154368

(51) Int. Cl.
*F16H 59/46* (2006.01)
*F16H 61/662* (2006.01)
(Continued)

(52) U.S. Cl.
CPC ....... *F16H 61/66272* (2013.01); *F16H 59/42* (2013.01); *F16H 59/46* (2013.01);
(Continued)

(58) Field of Classification Search
None
See application file for complete search history.

(56) References Cited

U.S. PATENT DOCUMENTS 6,916,269 B2 * 7/2005 Yamamoto .......... F16H 61/0021
                                                    477/45
8,812,206 B2 * 8/2014 Totsuka ............ F16H 61/66272
                                                    474/28

FOREIGN PATENT DOCUMENTS

JP    2003-269591 A    9/2003
JP    2005-114088 A    4/2005
(Continued)

*Primary Examiner* — Dirk Wright
(74) *Attorney, Agent, or Firm* — Foley & Lardner LLP

(57) ABSTRACT

A control device for a continuously variable transmission includes a wheel speed difference sensing section configured to sense a wheel speed difference between the driving wheel and the driven wheel from a detection value of the first rotation speed sensor and a detection value of the second rotation speed sensor; and a clamping force increasing section configured to increase a clamping force for sandwiching a belt of the continuously variable transmission by a pulley when the wheel speed difference becomes equal to or greater than a first predetermined value, relative to a case where the wheel speed difference is smaller than the first predetermined value.

5 Claims, 3 Drawing Sheets

(51) Int. Cl.
*F16H 59/42* (2006.01)
*F16H 59/48* (2006.01)
*F16H 61/12* (2010.01)

(52) U.S. Cl.
CPC .............. *F16H 59/48* (2013.01); *F16H 61/12* (2013.01); *F16H 2061/1284* (2013.01); *F16H 2061/66277* (2013.01)

(56) References Cited

FOREIGN PATENT DOCUMENTS

| | | |
|---|---|---|
| JP | 2006-220259 A | 8/2006 |
| JP | 2007-162796 A | 6/2007 |

* cited by examiner

CONTROLLER FOR CONTINUOUSLY VARIABLE TRANSMISSION

TECHNICAL FIELD

This invention relates to a control device for a continuously variable transmission.

BACKGROUND ART

A patent document 1 discloses an art to accurately judge a state of a road surface, and to perform a hydraulic control of a clamping force of a belt type continuously variable transmission which is appropriate for the actual state of the road surface. In particular, a band-pass filter processing is performed to a detection value of a rotation speed of a driving wheel. A value obtained by that processing is totally-integrated with time. A road surface state is judged based on that time total integrated value. When it is judged that the road surface state is a rough road, a clamping force is increased to be greater than that when a smooth road is judged.

However, for accurately judging the state of the road surface, the band-pass filter processing is performed to the detection value, and the total integration is performed with time. Accordingly, it takes time to judge. The control to increase the clamping force does not make it in time even when the rough road is judged. Consequently, a belt slippage may be generated. For example, on a road surface whose a road surface frictional coefficient (hereinafter, described as μ) is spotted (dappled), the driving wheels are slipped on a low μ portion, and immediately then gripped on a high μ portion, so that a torque inputted to the continuously variable transmission is increased. When it takes the time to judge the rough road on this road surface, the control to increase the clamping force does not make it in time due to the response delay of the hydraulic pressure. The slippage is generated between the belt and the pulleys.

PRIOR ART DOCUMENT

Patent Document

Patent Document 1: Japanese Patent Application Publication No. 2003-269591

SUMMARY OF THE INVENTION

It is an object to provide a control device for a continuously variable transmission arranged to suppress a belt slippage without depending on a road surface state.

A control device for a continuously variable transmission according to the present invention, the control device comprises: a first rotation speed sensor arranged to sense a rotation speed of a driving wheel; a second rotation speed sensor arranged to sense a rotation speed of a driven wheel; a wheel speed difference sensing section configured to sense a wheel speed difference between the driving wheel and the driven wheel from a detection value of the first rotation speed sensor and a detection value of the second rotation speed sensor; and a clamping force increasing section configured to increase a clamping force for sandwiching a belt of the continuously variable transmission by a pulley when the wheel speed difference becomes equal to or greater than a first predetermined value, relative to a case where the wheel speed difference is smaller than the first predetermined value.

By the present invention, the rough road is judged based on the wheel speed difference of the rotation speeds of the driving wheel and the driven wheel. Accordingly, it is possible to immediately increase the clamping force when the driving wheel is slipped. Consequently, it is possible to prevent the belt slippage according to the grip force increase of the driving wheels after the slippage.

DESCRIPTION OF EMBODIMENTS

Hereinafter, an embodiment according to the present invention is illustrated based on the drawings. In this specification, a "smooth road" is a paved road paved by asphalt, concrete and so on. A "rough road" is an unpaved road in general, such as a gravel road, a macadam road and so on. The rough road includes a rough road on which an obstacle such as a large stone, a wood, and a curbstone, and/or a road depression portion exist in a travel direction, whose a road surface is largely recessed and raised, and from which a sudden torque is inputted from driving wheels to a transmission. The "sudden torque" is a sudden large torque temporarily inputted from the driving wheels to the transmission when the vehicle runs on to the obstacle, or when the idling (racing) wheels are landed on the road surface again after the vehicle is got over the obstacle.

Figure 1:
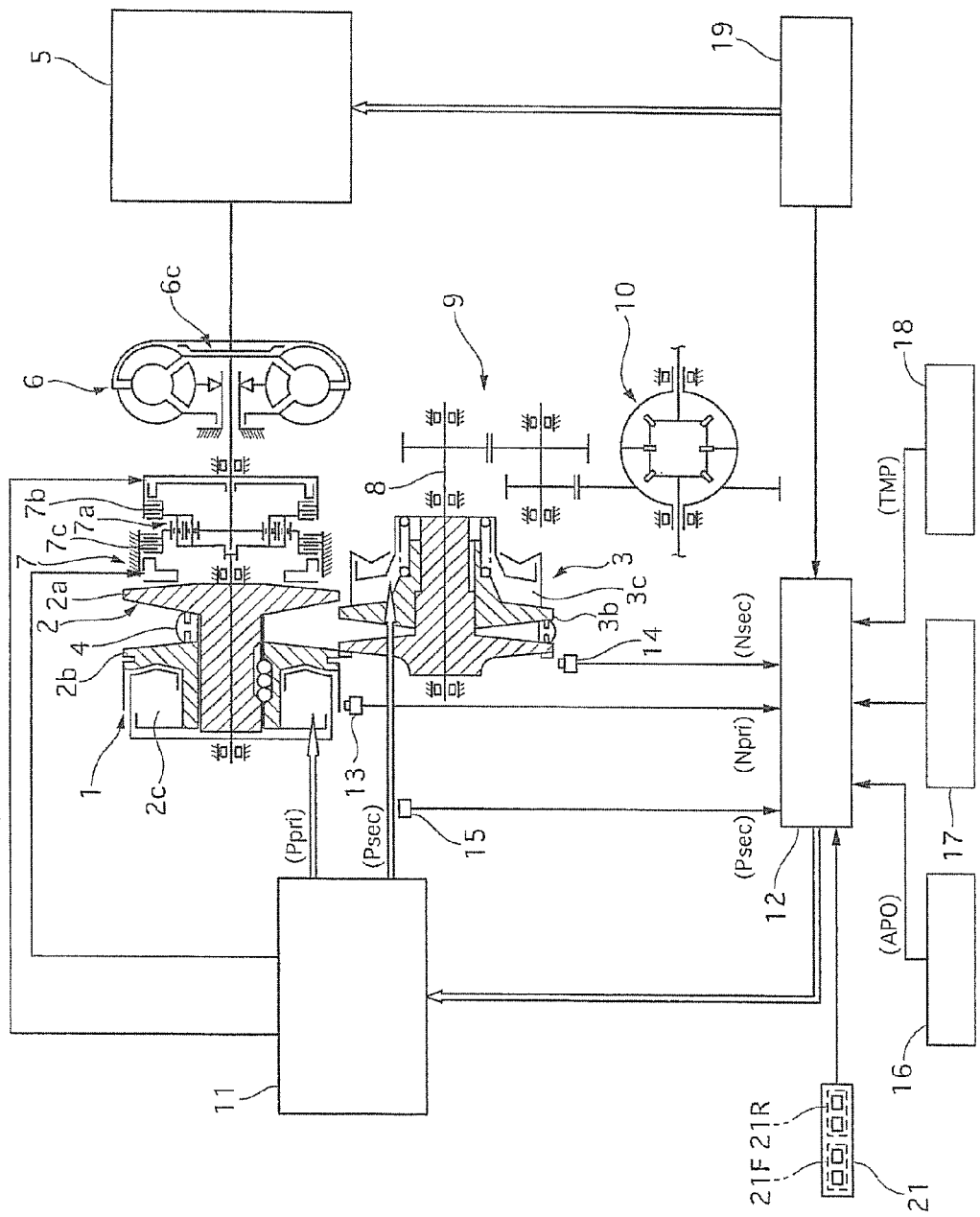
FIG. 1 is a system diagram showing a configuration of a control device for a continuously variable transmission according to an embodiment.

FIG. 1 is a system diagram showing a configuration of a control device of a continuously variable transmission according to the embodiment. A belt type continuously variable transmission (hereinafter, referred to as a "CVT") 1 includes a primary pulley 2 and a secondary pulley 3 which are torque transmitting members, and which are disposed so that V-grooves of the primary pulley 2 and the secondary pulley 3 are aligned with each other; and a belt 4 wound around the V-grooves of these pulleys 2 and 3. An engine 5 is disposed coaxially with the primary pulley 2. A torque converter 6 including a lock-up clutch 6c, and a forward/rearward movement switching mechanism 7 are provided in this order from the engine 5's side between the engine 5 and the primary pulley 2.

The forward/reward movement switching mechanism 7 includes a double pinion planetary gear set 7a as a main component. The double pinion planetary gear set 7a includes a sun gear connected through the torque converter 6 to the engine 5; and a carrier connected to the primary pulley 2. Moreover, the forward/rearward movement switching mechanism 7 includes a forward clutch 7b arranged to directly connect the sun gear and the carrier of the double pinion planetary gear set 7a; and a rearward brake 7c arranged to fix a ring gear. At an engagement of the forward clutch 7, an input rotation from the engine 5 through the torque converter 6 is transmitted directly to the primary pulley 2. At the engagement of the rearward brake 7c, the input rotation from the engine 5 through the torque converter 6 is reversed, and then transmitted to the primary pulley 2.

A rotation of the primary pulley 2 is transmitted through the belt 4 to the secondary pulley 3. A rotation of the secondary pulley 3 is transmitted through an output shaft 8, a gear set 9, and a differential gear device 10 to driving wheels (not shown). For varying a transmission gear ratio between the primary pulley 2 and the secondary pulley 3 during transmitting the power, the primary pulley 2 and the secondary pulley 3 include, respectively, fixed conical plates 2a and 3a which are conical plates forming the V-grooves of the primary pulley 2 and the secondary pulley 3; and movable plates 2b and 3b which are conical plates forming the V-grooves, and which are arranged to be moved in an axial direction.

These movable conical plates 2b and 3b are arranged to be urged toward the fixed conical plates 2a and 3a by supply of a primary pulley pressure Ppri and a secondary pulley pressure Psec which are produced based on the line pressure, to a primary pulley chamber 2c and a secondary pulley chamber 3c. With this, the belt 4 is frictionally engaged on the conical plates so as to transmit the power between the primary pulley 2 and the secondary pulley 3. At the shift, widths of the V-grooves of the pulleys 2 and 3 are varied by a pressure difference between the primary pulley pressure Ppri and the secondary pulley pressure Psec that are produced in accordance with a target transmission gear ratio. With this, wounding radii of the belt 4 with respect to the pulleys 2 and 3 are continuously varied to attain the target transmission gear ratio.

A shift control hydraulic circuit 11 controls the primary pulley pressure Ppri, the secondary pulley pressure Psec, and also engagement hydraulic pressures of the forward clutch 7b engaged at the selection of the forward traveling range, and the rearward clutch 7c engaged at the selection of the rearward traveling range. The shift control hydraulic circuit 11 performs the control in response to a signal from a transmission controller 12.

The transmission controller 12 receives a signal from a primary pulley rotation sensor 13 (corresponding to a third rotation speed sensor) arranged to sense the rotation speed Npri of the primary pulley 2, a signal from a secondary pulley rotation sensor 14 arranged to sense the rotation speed Nsec of the secondary pulley 3, a signal from a secondary pulley pressure sensor 14 arranged to sense a secondary pulley pressure Psec, a signal from an accelerator operation amount sensor 16 arranged to sense an operation amount of an accelerator pedal, a selection range signal from an inhibitor switch 17 arranged to sense a selection lever position, a signal from an oil temperature sensor 18 arranged to sense a hydraulic fluid temperature TMP of the CVT 1, signals (the engine speed, a fuel injection time period and so on) relating to an input torque Tp from an engine controller 19 configured to control the engine 5, and a signal from wheel speed sensors 21 (a wheel speed sensor of front wheels which are driving wheels is represented as 21R, and a wheel speed sensor of rear wheels which are driven wheels is represented as 21R) arranged to sense wheel speeds of the wheels.

The transmission controller 12 calculates a wheel speed difference of the front and rear wheels from the signal of the wheel speed sensor 21F of the front wheels which are the driving wheels, and the signal of the wheel speed sensor 21R of the rear wheels which are the driven wheels. The transmission controller 12 is configured to judge the rough road traveling from a magnitude of the wheel speed difference. Then, when the rough road traveling is judged, the transmission controller 12 performs a rough road detection control operation. The rough road detection control operation is to release (disengage) the lock-up clutch 6c, to output, to the transmission control hydraulic circuit 11, a command to increase the secondary pulley pressure Psec (hereinafter, described also as the clamping force) to a rough road control pressure P1 to increase torque capacities of the pulleys 2 and 3, and to output, to the engine controller 19, a command (the fuel injection decrease command, an intake air amount decrease command and so on) to decrease the output torque of the engine 5 so as to decrease the input torque to the CVT 1 to be smaller than the torque capacity of the pulley. In this way, the rough road judgment is performed based on the wheel speed sensor signals. Accordingly, it is possible to rapidly increase the clamping force when the driving wheels are slipped, and to prevent the belt slippage according to the increase of the grip forces of the driving wheels after the slippage. With this, it is possible to provide, to the secondary pulley 3, the clamping force by which the belt 4 is not slipped even when the sudden torque is inputted, and thereby to increase the torque capacity of the secondary pulley 3. Moreover, it is possible to decrease the input torque to the CVT 1, and to effectively protect the CVT 1 from the suddenly generated torque.

Figure 2:
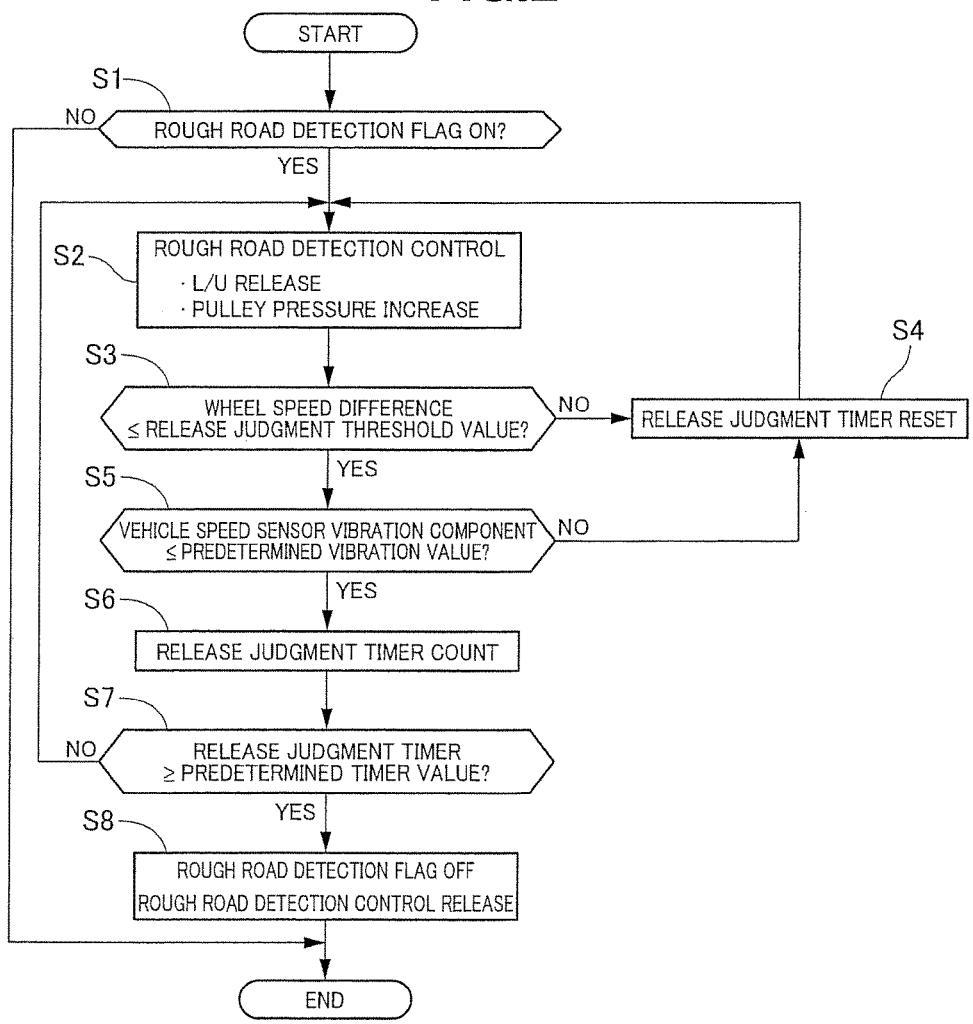
FIG. 2 is a flowchart showing a rough road control operation according to the embodiment.

FIG. 2 is a flowchart showing the rough road control operation in the embodiment.

At step S1, the rough road detection is performed. When the road is the rough road, the rough road detection flag is brought to the ON state. Then, the process proceeds to step S2. Otherwise, when the road is the smooth road, the process is finished. In this case, the rough road detection is judged based on whether or not the wheel speed difference which is a difference between the rotation speed of the driving wheel that is sensed by the wheel speed sensor 21F, and the rotation speed of the driven wheel that is sensed by the wheel speed sensor 21R is equal to or greater than an entering judgment threshold value (corresponding to a first predetermined value). When the wheel speed difference is equal to or greater than the entering judgment threshold value, the rough road is judged, so that the rough road detection flag is brought to the ON state. When the wheel speed difference is smaller than the entering threshold value, the smooth road is judged, so that the rough road detection flag is brought to the OFF state.

At step S2, the rough road detection control is performed. That is, the lock-up clutch 6c is released (disengaged), and the secondary pulley pressure Psec is increased to the rough road control pressure P1.

At step S3, it is judged whether or not the wheel speed difference is equal to or smaller than a release judgment threshold value (corresponding to a second predetermined value). When the wheel speed difference is equal to or smaller than the release judgment threshold value, the process proceeds to step S5. When the wheel speed difference is greater than the release judgment threshold value, the process proceeds to step S4. The release judgment threshold value is set to a value smaller than the entering judgment threshold value.

Besides, it is constantly monitored whether or not there is an abnormal state (for example, an abnormality of the output value, wire breaking and so on) of the wheel speed sensors 21 by other routine (not shown). When the wheel speed sensor 21 is in the abnormal state, it is judged that it is equal to or smaller than the release judgment threshold value. The process proceeds to step S5. With this, it is possible to avoid that the rough road detection control cannot be released in the abnormal state of the wheel speed sensor 21. The continuation of the rough road detection control causes the deterioration of the fuel consumption.

At step S4, the release judgment timer is reset. The process returns to step S2 to continue the rough road detection control. In this case, the release judgment timer is a timer arranged to be counted up when the wheel speed difference is equal to or smaller than the release judgment threshold value. By permitting the release when a state where the wheel speed difference is equal to or smaller than the release judgment threshold value is continued during the predetermined period, the hunting according to the judgment is suppressed.

At step S18, a vehicle speed vibration component is extracted from the wheel speed sensor 21R of the driven wheels. It is judged whether or not the vehicle speed vibration is equal to or smaller than a predetermined vibration value (corresponding to a third predetermined value). When the vehicle speed vibration is equal to or smaller than the predetermined vibration value, the process proceeds to step S6. Otherwise, the process returns to step S4 to reset the release judgment timer.

Figure 3:
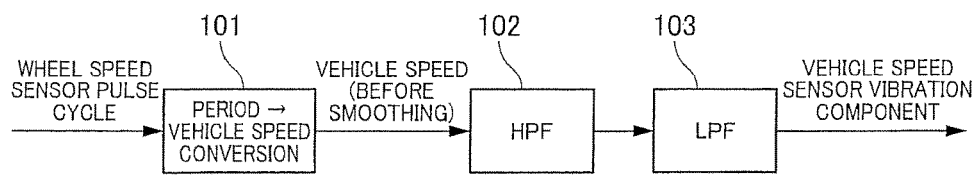
FIG. 3 is a control block diagram showing a vehicle speed vibration component extracting operation in the embodiment.

Hereinafter, the extraction of the vehicle speed vibration component is illustrated. FIG. 3 is a control block diagram for performing the vehicle speed component extraction operation in the embodiment. A vehicle speed conversion section 101 is configured to convert a wheel speed sensor pulse period (cycle) inputted from the wheel speed sensor 21R to the vehicle speed. It is possible to convert from the pulse number inputted during the calculation period (cycle) to the vehicle speed since the calculation period of the controller is determined. Next, a bypass filter 102 is configured to extract only a signal on a high frequency side from the converted vehicle speed signal. The vehicle speed variation when the vehicle travels on the smooth road is varied only at the low frequency by influence of the inertia of the vehicle. Accordingly, it is conceivable that the signal on the high frequency side is the vibration component. Next, a low pass filter 103 is configured to smooth the vehicle speed signal on the high frequency side. In the wheel, a frequency region in which the wheel can be actually vibrated is limited due to the influence of the inertia of the wheel. Accordingly, the noise is eliminated (removed) by the low pass filter 103. The vibration which is actually generated in the wheel is extracted, so that the vibration component is extracted.

In the rough road control operation according to the embodiment, the rough road judgment is performed by using the wheel speed difference for improving the response of the rough road detection. Accordingly, if the judgment to finish the rough road detection control only by using wheel speed difference, the rough road detection control may be finished by a temporal convergence of the wheel speed difference even when the road is the rough road. In this case, even when the rough road judgment is immediately performed again, there is a problem of the response of the hydraulic pressure control for increasing the clamping force. Accordingly, the clamping force may not be increased before the generation of the belt slippage. On the other hand, in the embodiment, the judgment of the finish of the rough road detection control is performed in consideration of the vibration component of the vehicle speed, in addition to the wheel speed difference. Consequently, it is possible to avoid the unintentional finish of the rough road detection control.

Besides, in the abnormal state of the wheel speed sensor 21, the vibration component is extracted based on the sensor pulse period sensed by the primary pulley rotation sensor 13. In this case, even when the transmission gear ratio is varied, the frequency of the variation of the transmission gear ratio is extremely low. Accordingly, it is possible to exclude the influence by the low pass filter. Then, it is judged whether or not the vibration of the primary pulley 2 is equal to or smaller than a predetermined vibration value (corresponding to a fourth predetermined value). When the vibration is equal to or smaller than the predetermined vibration value, the process proceeds to step S6. Otherwise, the process returns to step S4 to reset the release judgment timer. That is, when the wheel speed sensor 21 becomes the abnormal state and the sensed wheel speed difference becomes large irrespective of the state of the road, the clamping force becomes large by the rough road detection control. In this case, it is not possible to return the clamping force to the low clamping force in the normal state. Accordingly, the fuel consumption may be deteriorated. Therefore, the wheel speed difference is not used for the release judgment in the abnormal state of the wheel speed sensor 21. The only vibration component of the primary pulley rotation sensor 13 is used for the release judgment. Consequently, when the road surface state becomes the smooth road, it is possible to return the clamping force to the low clamping force in the normal state, and to suppress the deterioration of the fuel consumption.

At step S6, the release judgment timer is counted up.

At step S7, it is judged whether the count value of the release judgment timer is equal to or smaller than, or equal to or greater than the predetermined timer value. When the count value is equal to or greater than the predetermined timer value, the process proceeds to step S8. Otherwise, the process returns to step S2 to continue the rough road detection control.

At step S8, the rough road detection flag is brought to the OFF state, and the rough road detection control is released.

Figure 4:
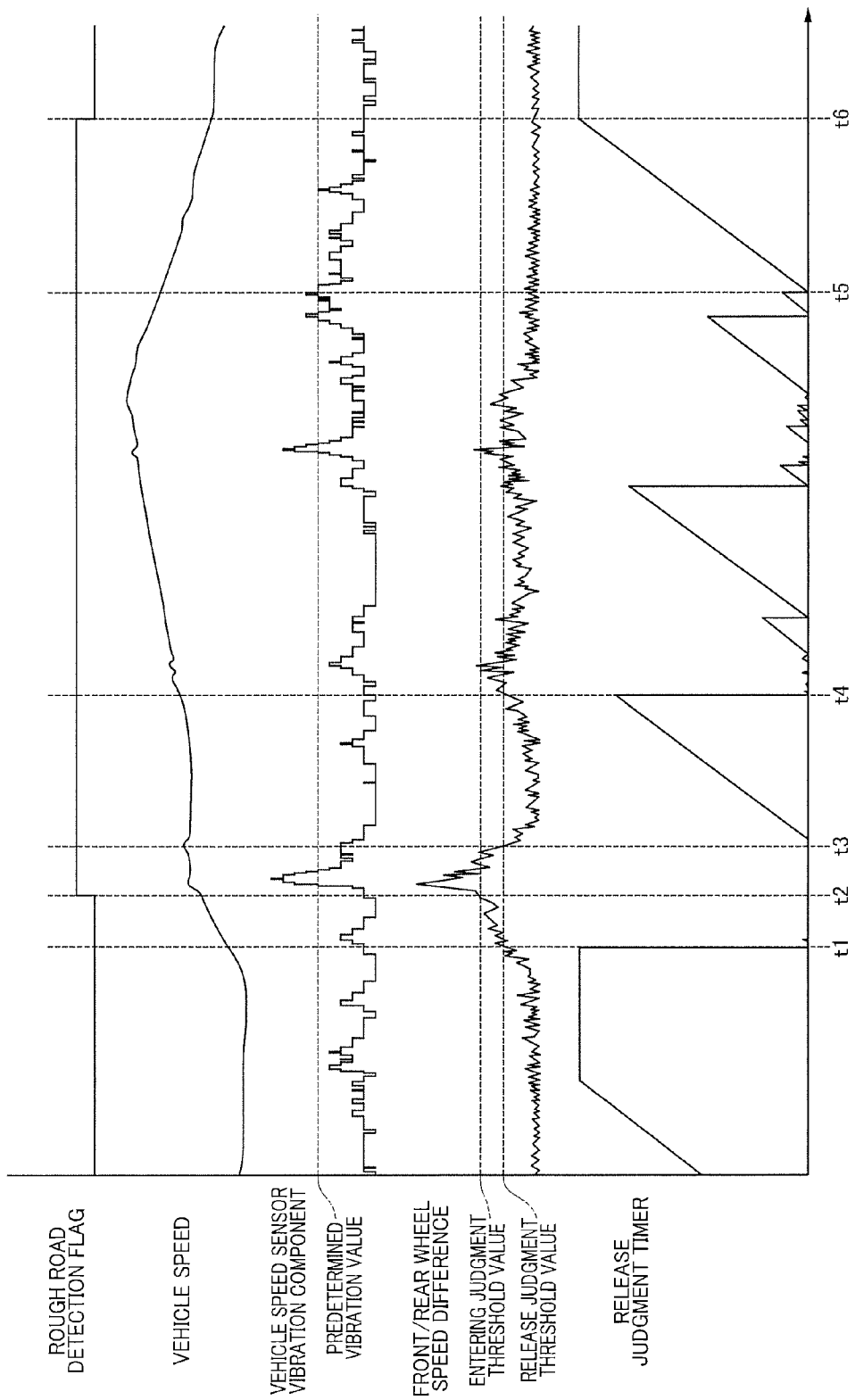
FIG. 4 is a time chart showing the rough road control operation in the embodiment.

FIG. 4 is a time chart showing the rough road control operation in the embodiment. Besides, the initial traveling state is a state where the vehicle travels at a substantially constant speed, where the rough road detection flag is in the OFF state, and where the release judgment timer is counted up to the predetermined timer value.

At time t1, when the vehicle enters the rough road so that the wheel speed difference exceeds the release judgment threshold value, the release judgment timer is reset.

At time t2, when the wheel speed difference becomes equal to or greater than the entering threshold value, the rough road detection flag is brought from the OFF state to the ON state. The rough road detection control is performed. With this, the wheel speed difference is directed in the convergence direction. In this way, the rough road detection is performed based on the wheel speed difference. Accordingly, it is possible to rapidly sense the rough road, and to suppress the belt slippage.

At time t3, the wheel speed difference becomes smaller than the release judgment threshold value, and the vibration component is equal to smaller than the predetermined vibration value. Accordingly, the release judgment timer is started to be counted up.

At time t4, when the wheel speed difference becomes greater than the release judgment threshold value again, the count-up of the release judgment timer is reset. Accordingly, the rough road detection flag is maintained to the ON state to continue the rough road detection control. In this way, the rough road detection flag is set by using the release judgment timer. Consequently, it is possible to suppress the variation of the clamping force according to the operation and the non-operation of the rough road detection control.

At time t5, the road is shifted from the rough road to the smooth road. The vibration component becomes equal to or smaller than the predetermined vibration value. Moreover, the wheel speed difference is smaller than the release judgment threshold value. Accordingly, the release judgment timer is started to be counted up. Then, at time t6, when the count value of the release judgment timer is counted up to the predetermined timer value, the rough road detection flag is set from the ON state to the OFF state. The rough road detection control is finished. In this way, at the release of the rough road detection control, it is possible to further stably attain the release judgment by judging by the decrease of the vibration component, in addition to the wheel speed difference.

As explained above, it is possible to attain the following effects and the following operations in the embodiment.

(1) There are provided the wheel speed sensor 21F (a first rotation speed sensor) arranged to sense the rotation speed of the driving wheel;

the wheel speed sensor 21R (a second rotation speed sensor) arranged to sense the rotation speed of the driven wheel;

the step S1 (the wheel speed difference sensing section) configured to sense the wheel speed difference of the driving wheel and the driven wheel from the detection value of the wheel speed sensor 21F and the detection value of the wheel speed sensor 21R;

the step S1 (the rough road judging section) configured to judge that the road surface in the traveling is the rough road when the wheel speed difference becomes equal to or greater than the entering judgment threshold value (the first predetermined value);

the step S2 (the clamping force increasing section) configured to increase the clamping force for sandwiching the belt of the continuously variable transmission by the pulley hydraulically controlled when the rough road is judged, relative to a case where the rough road is not judged;

the step S5 configured to sense the vibration of the vehicle speed based on the detection value of the wheel speed sensor 21R (at least one of the first rotation speed sensor and the second rotation speed sensor); and the step S8 (the increase release section) configured to decrease the clamping force increased by the step S2 (the clamping force increase section) when the sensed wheel speed difference is equal to or smaller than the release judgment threshold value (the second predetermined value), and when the sensed vibration is equal to or smaller than the predetermined vibration value (the third predetermined value).

That is, the rough road is judged based on the wheel speed difference between the driving wheel and the driven wheel. Accordingly, it is possible to immediately increase the clamping force when the driving wheel is slipped. Consequently, it is possible to prevent the belt slippage according to the increase of the grip force of the driving wheels after the slippage.

Moreover, the increased clamping force is decreased after the wheel speed difference and the vibration of the vehicle speed are decreased, respectively, equal to or smaller than the predetermined values. Accordingly, it is possible to accurately judge the escape from of the rough road. Moreover, it is possible to avoid the decrease of the clamping force irrespective of the state where the vehicle travels on the rough road on which the input torque is suddenly increased, and to prevent the belt slippage.

Furthermore, the clamping force is decreased to the clamping force according to the smooth road when the wheel speed difference and the vibration of the vehicle speed are converged. Accordingly, it is possible to decrease the time period during which the vehicle travels in the state where the clamping forces are unnecessarily high even when the road is returned to the smooth road.

(2) There are provided the primary pulley rotation sensor 13 (the third rotation speed sensor) arranged to sense the rotation speed of the primary pulley 2 connected to the side of the engine 5 (the driving source); and the sensor abnormality sensing section arranged to sense the abnormal state of at least one of the wheel speed sensor 21F and the wheel speed sensor 21R. The step S5 (the vibration sensing section) is configured to sense the vibration of the rotation speed of the primary pulley 2 from the detection value of the primary pulley rotation sensor 13. The step S8 is configured not to use the sensed wheel speed difference when the abnormality of the wheel speed sensor 21 is sensed, and to decrease the clamping force increased by the step S2 when the vibration sensed from the primary pulley rotation sensor 13 is equal to or smaller than the predetermined vibration value (the fourth predetermined value).

Accordingly, in the abnormal state of the wheel speed sensor 21, the wheel speed difference is not used, and the only vibration component of the primary pulley rotation sensor 13 is used for the release judgment. Consequently, it is possible to return the clamping force to the low clamping force in the normal state when the road surface state becomes the smooth road, and to suppress the deterioration of the fuel economy.

Hereinabove, although the present invention is illustrated based on the one embodiment, the present invention is not limited to the above described configuration. It is possible to apply the present invention.

In the above-described embodiment, the present invention is applied to the front-wheel drive vehicle. However, the present invention is applicable to the four-wheel drive vehicle. In this case, the sufficient wheel speed difference may not be generated. Therefore, in the rough road judgment at step S1, the following two conditions are introduced as OR condition.

(a) The accelerations of the wheels are calculated. A state in which the acceleration is greater than an accelerator increase side entering judgment threshold value (a fifth predetermined value) that is considered to be increased by the slippage is continued during a predetermined time period.

(b) The accelerations of the wheels are calculated. A state in which the acceleration is smaller than an accelerator decrease side entering judgment threshold value (a sixth predetermined value) that is considered to be decreased by the obstruct is continued during a predetermined time period.

The acceleration decrease side entering judgment threshold value is a small value smaller than the acceleration increase side entering threshold value. In this case, when one of the above-two conditions, and a condition in which the wheel speed difference between the front and rear wheels becomes equal to or greater than the entering threshold value is satisfied, the rough road is judged. With this, it is possible to effectively sense the rough road.

Besides, when the rough road detection control is released in a case where the rough road detection control is released in the four-wheel drive vehicle after the rough road is judged by the above-described conditions, the rough road detection control is released in accordance with the conditions of the wheel speed difference and the vehicle speed vibration. With this, it is possible to rapidly decrease the clamping force when the rough road is misjudged, and thereby to suppress the deterioration of the fuel economy.

The invention claimed is:

1. A control device for a continuously variable transmission, the control device comprising:
   a first rotation speed sensor arranged to sense a rotation speed of a driving wheel;
   a second rotation speed sensor arranged to sense a rotation speed of a driven wheel;
   a wheel speed difference sensing section configured to sense a wheel speed difference between the driving wheel and the driven wheel from a detection value of the first rotation speed sensor and a detection value of the second rotation speed sensor; and
   a clamping force increasing section configured to increase a clamping force for sandwiching a belt of the continuously variable transmission by a pulley when the wheel speed difference becomes equal to or greater than a first predetermined value, relative to a case where the wheel speed difference is smaller than the first predetermined value,
   wherein the control device comprises a vibration sensing section configured to sense a vibration of a speed of a vehicle based on the detection value of at least one of the first rotation speed sensor and the second rotation speed sensor, and an increase releasing section configured to decrease the clamping force increased by the clamping force increasing section when the sensed wheel speed difference is equal to or smaller than a second threshold value, and when the sensed vibration is equal to or smaller than a third threshold value.

2. The control device for the continuously variable transmission as claimed in claim 1, wherein the control device comprises a rough road judging section configured to judge that a traveling road surface is a rough road when the wheel speed difference becomes equal to or greater than the first predetermined value.

3. The control device for the continuously variable transmission as claimed in claim 1, wherein the control device comprises a third rotation speed sensor arranged to sense a rotation speed of a primary pulley connected to a side of a driving source, and an abnormality sensing section configured to sense an abnormal state of at least one of the first rotation speed sensor and the second rotation speed sensor; the vibration sensing section is configured to sense a vibration of the primary pulley from a detection value of the third rotation speed sensor; and the increase releasing section is configured not to use the sensed wheel speed difference when the abnormal state of one of the first rotation speed sensor and the second rotation speed sensor is sensed, and to decrease the clamping force increased by the clamping force increasing section when the vibration sensed from the third rotation speed sensor is equal to or smaller than a fourth threshold value.

4. A control device for a continuously variable transmission, the control device comprises:
   a first rotation speed sensor arranged to sense a rotation speed of a front driving wheel;
   a second rotation speed sensor arranged to sense a rotation speed of a rear driving wheel;
   an acceleration sensing section configured to sense an accelerator of the driving wheel from the detection value of one of the first rotation speed sensor and the second rotation speed sensor;
   a wheel speed difference sensing section configured to sense a wheel speed difference between the front driving wheel and the rear driving wheel from the detection values of the first rotation speed sensor and the second rotation speed sensor; and
   a clamping force increasing section configured to increase a clamping force for sandwiching a belt of the continuously variable transmission by a pulley when the wheel speed difference becomes equal to or greater than a first predetermined value, when the acceleration of the driving wheel is equal to or greater than a fifth predetermined value, or when the acceleration of the driving wheel is equal to or smaller than a sixth predetermined value smaller than the fifth predetermined value, relative to a case in which the above-conditions are not satisfied,
   wherein the control device comprises a vibration sensing section configured to sense a vibration of a speed of a vehicle based on the detection value of at least one of the first rotation speed sensor and the second rotation speed sensor, and an increase releasing section configured to decrease the clamping force increased by the clamping force increasing section when the sensed wheel speed difference is equal to or smaller than a second threshold value, and when the sensed vibration is equal to or smaller than a third threshold value.

5. The control device for the continuously variable transmission as claimed in claim 4, wherein the control device comprises a third rotation speed sensor arranged to sense a rotation speed of a primary pulley connected to a side of a driving source, and an abnormality sensing section configured to sense an abnormal state of at least one of the first rotation speed sensor and the second rotation speed sensor; the vibration sensing section is configured to sense a vibration of the primary pulley from a detection value of the third rotation speed sensor; and the increase releasing section is configured not to use the sensed wheel speed difference when the abnormal state of one of the first rotation speed sensor and the second rotation speed sensor is sensed, and to decrease the clamping force increased by the clamping force increasing section when the vibration sensed from the third rotation speed sensor is equal to or smaller than a fourth threshold value.

* * * * *